United States Patent
Herchenbach et al.

(10) Patent No.: US 6,406,375 B1
(45) Date of Patent: Jun. 18, 2002

(54) PROTECTIVE DEVICE FOR A DRIVE ASSEMBLY WITH A DOUBLE UNIVERSAL JOINT

(75) Inventors: Paul Herchenbach, Ruppichteroth; Andreas Sarfert, Bonn, both of (DE)

(73) Assignee: GKN Walterscheid GmbH (DE)

( * ) Notice: Subject to any disclaimer, the term of this patent is extended or adjusted under 35 U.S.C. 154(b) by 0 days.

(21) Appl. No.: 09/706,225

(22) Filed: Nov. 3, 2000

(30) Foreign Application Priority Data

Nov. 5, 1999 (DE) .......................... 199 53 463
Jul. 27, 2000 (DE) .......................... 100 37 041

(51) Int. Cl.[7] ................................. F16D 3/84
(52) U.S. Cl. ........................ 464/172; 464/175
(58) Field of Search ................. 464/7, 11, 12, 464/13, 14, 172, 173, 175, 178; 277/636; 403/51; 49/414, 453

(56) References Cited

U.S. PATENT DOCUMENTS

| | | | |
|---|---|---|---|
| 996,156 A | * 6/1911 | Spicer | 464/172 X |
| 4,282,722 A | * 8/1981 | Orain | 464/7 X |
| 4,605,332 A | * 8/1986 | Mayhew et al. | 464/173 X |
| 5,879,238 A | 3/1999 | Breheret | |
| 6,123,622 A | 9/2000 | Mikeska et al. | |
| 6,159,104 A | * 12/2000 | Mikeska et al. | 464/172 X |

FOREIGN PATENT DOCUMENTS

| | | |
|---|---|---|
| DE | 20 46 236 | 4/1971 |
| DE | 2419236 A | 5/1975 |
| DE | 30 33 850 | 3/1982 |
| DE | 195 41 512 | 5/1997 |
| DE | 19629998 C1 | 3/1998 |
| DE | 19744313 A1 | 4/1999 |
| EP | 0969218 A2 | 1/2000 |
| GB | 2107411 A | 4/1983 |
| GB | 2115520 A | 9/1983 |
| NL | 7008171 | 6/1970 |

* cited by examiner

Primary Examiner—Greg Binda
(74) Attorney, Agent, or Firm—Harness, Dickey & Pierce, P.L.C.

(57) ABSTRACT

A protective device for a driving assembly with a double universal joint has a protective cone (13) made of plastic. At a first axial end, the protective cone (13) is secured to a bearing assembly (12). At its second axial end (16), the protective cone (13) carries a guiding ring (18). Folds (15) are arranged between the axial ends. A hollow-spherical-zone-like inner bearing face (19) of the guiding ring (18) is arranged on a spherical outer bearing face (26) of a bearing race (25). A sliding ring (30) in the bearing race (25) is supported in a bearing groove (27) of the double yoke (2) of the double universal joint (1). The guiding ring (18) is pre-tensioned by the folds (15) of the protective cone (13) and thus held in contact with the outer bearing face (26). The guiding ring (18) can be removed from the bearing assembly, thus making components of the double universal joint accessible for maintenance purposes, such as lubrication.

10 Claims, 4 Drawing Sheets

PROTECTIVE DEVICE FOR A DRIVE ASSEMBLY WITH A DOUBLE UNIVERSAL JOINT

CROSS-REFERENCE TO RELATED APPLICATION

This application is based upon and claims priority to German Patent Application 199 53 463.2 filed Nov. 5, 1999, and German Patent Application 100 37 041.1 filed Jul. 27, 2000, which applications are herein expressly incorporated by reference.

BACKGROUND OF THE INVENTION

The invention relates to a protective device for a drive assembly. The drive assembly includes a double universal joint with a double yoke, a first joint yoke, a second joint yoke and a first and a second cross member. The cross members articulatably connect the first joint yoke and the second joint yoke to a first and a second yoke associated with the double yoke.

DE 30 33 850 A1 describes a protective device for a double universal joint. A protective cone is connected to bearing means supported on a joint yoke. A tubular protective element is supported on the double yoke by a bearing race. In the non-articulated condition of the joint, the protective cone covers part of the length of the tubular protective element. Both components are connected to one another by friction locking, form-fitting or connecting means. Thus, in the direction of rotation, a permanent relative movement relative to one another is avoided. However, the existing protective assembly only allows the double universal joint to be partially covered in the axial direction if easy access to the components of the double universal joint is desired.

DE-OS 20 46 236 describes a protective device for a double universal joint. The protective device includes a protective dish associated with the first joint yoke. The protective dish extends over one end of a protective element which is rotatably movably supported on the inner double yoke. The protective element covers those partial regions of the double yoke which are positioned to one side of the bearing. The protecting portion of the protective element faces away from the protective dish and projects into a protective cone. A gap occurs between the elements of the protective device when the double universal joint is articulated. The gap enables engagement from the outside. Equally, when loads generated by external forces are applied, there is no adequate resistance because the protective elements are each open on one side and can thus be deformed. In consequence, there is a possibility of contact with the rotating components of the double universal joint. This contact may result in damage to the components. Thus, the protective function to prevent contact is no longer ensured.

DE 195 41 512 C1 describes a protective device for a driveshaft. The device has two single universal joints which are connected to one another in a rotationally fast way by two profiled tubes inserted into one another. The assembly is covered by the protective device. The protective device has two protective tubes enclosing the profiled tubes and protective cones connected to their ends by means of an attaching cap. The protective cones include folds. In order to ensure the radial stability of the protective cone, even if the latter is of the soft type, a supporting ring is provided which supports the protective cone at a distance from its fixing means on the inside of the attaching cap.

EP 0969218 A1 describes a protective device for a drive assembly with a double universal joint. Here, the protective cone includes folds and is secured by its first axial end to a bearing assembly of a driveshaft. Its second axial end has a fixing portion connected to a guiding ring. The guiding ring, via its inner end, projects into that part of the protective cone which is provided with folds. The guiding ring, in turn, via a cylindrical bore, is supported on an externally spherical bearing race which is supported on the inner double yoke of the double universal joint. As a result, a relative axial movement is permitted between the guiding ring and the bearing race. However, it has been found that this kind of support does not provide the required articulation ability. Accordingly, in view of the inadequately defined conditions of movement carried out by the protective cone with its folds and the guiding ring attached thereto relative to the bearing race, the amount of wear increases. In particular, wear occurs in the region of contact between the cylindrical bore of the guiding ring and the spherical outer face of the bearing race. In practical terms, a line contact exists. However, the advantage of this assembly is that a relatively long protective cone region exists with the folds. This leads to the ability to accommodate larger articulation angles.

SUMMARY OF THE INVENTION

It is an object of the present invention to provide a protective device for a drive assembly having a double universal joint. The protective device covers the rotating parts of the double universal joint. The protective device covers the rotating parts of the double universal joint and enables easy access to the double universal joint for maintenance work, while featuring a long service life.

In accordance with the invention, a protective device includes a plastic protective cone with a first axial end, a second axial end and folds therebetween. The protective device, at least in the axial direction, enables elastic deformation. The first axial end of the protective cone serves to be releasably connected to a bearing assembly at the first joint yoke. The second axial end serves as a fixing portion. A bearing race is rotatably supported around a rotational axis at the double yoke. The bearing race is positioned in the protective cone and includes a spherical outer bearing face. A guiding ring has an inner bearing face in the form of a hollow-spherical zone. The guiding ring has a first opening facing the first axial end and a second opening facing away from the first opening. The second opening has an opening cross-section which, at its maximum, corresponds to the sphere diameter of the inner bearing face. The first opening has a diameter which is smaller relative to the second opening. The first opening is further offset from the center of the hollow-spherical-zone-like inner bearing face towards the first axial end than the second opening. The second opening is either positioned in a plane containing the center of the inner bearing face or is also offset therefrom towards the first axial end. The guiding ring is connected to the second axial end of the protective cone. The protective cone, via the folds of the protective cone and its inner bearing face, is held so as to be pre-tensioned into contact with the outer bearing face of the bearing race.

The protective device is complemented by the protective dish which is usually provided at the tractor or at the implement. The protective device partially projects into the dish. The advantage of this inventive design is that, under articulation, the calotte-like support provided for the guiding ring ensures clearly defined conditions of movement for the protective cone with its region provided with folds. Furthermore, clearly defined conditions of movement for the guiding ring exists relative to the bearing race in the sense of a spatial movement of the spherical or hollow-spherical faces. This is due to the fact that the faces are always in contact with one another as a result of being loaded by the folds of the plastic convoluted boot. In addition, a surface contact is achieved which clearly reduces the amount of wear and results in a correspondingly long service life of the protective device. It is possible to achieve a long length provided with folds so that even if one takes into account the spatial movement which the guiding ring is able to carry out relative to the bearing race, large articulation angles are possible. As a result of the pre-tension, that part of the protective cone which is provided with folds is sufficiently supported, thus ensuring a high degree of radial stability.

Furthermore, access to individual components, a lubricating nipple for lubricating the centering means or the cross member bearings of the double universal joint, is provided by release or displacement at the first axial end of the protective cone in the region of the bearing means. Further, the bearing race and the guiding ring enable an assembly which provide extensive cover towards the second joint yoke. Thus, between the first axial end and the second axial end, a long length is obtained which can be provided with folds. Such a length with folds also enables large articulation angles. The angles, in the case of such joints, cover a range up to 80°. The deformation behavior of the protective cone is advantageously affected by the spatial movability of the guiding ring (spherical bearing). Overall, a largely closed cover is provided so that any interference from the outside is prohibited.

According to a further embodiment of the invention, the guiding ring towards the second axial end, in its region adjoining the second opening, includes a hollow-cylindrical or widening portion whose diameter is at least as great as the sphere diameter of the inner bearing face. This measure makes it possible, from a design point, to provide extensive cover towards the second joint yoke.

According to one embodiment, the center of the outer bearing face and the inner bearing face are offset from the articulation center of the joint towards the first axial end. The joint includes the second joint yoke, the second yoke of the double yoke and the second cross member.

It is particularly advantageous if the center of the outer bearing face and the inner bearing face are identical with the articulation center of the joint including the second joint yoke, the second yoke of the double yoke and the second cross member. This measure enables pivoting around a common center.

According to a further embodiment of the invention, the guiding ring is rotatable to a limited extent relative to the bearing race around the rotational axis. Thus, the guiding ring and the bearing race are jointly rotationally driven. Accordingly, a relative movement between the bearing race and the guiding ring is prevented in order to avoid any wear between the two components. Thus, the bearing race enables a relative movement of the double yoke. In order to ensure that the bearing race, the protective cone, and the remaining components of the protective device are stationary when the components received within the protective device rotate, the bearing race includes circumferentially distributed guiding grooves. The grooves extend parallel to the rotational axis and are engaged, in the direction of rotation with play, by the guiding ring, via correspondingly circumferentially distributed guiding cams extending parallel to the rotational axis. Because of the short axial length of the guiding cams, the movement of the guiding ring relative to the bearing race required for a particular angle of articulation can be carried out.

In the case of embodiments wherein small articulation angles are sufficient, the guiding ring has circumferentially distributed guiding grooves which extend parallel to the longitudinal axis. The guiding grooves are engaged, with rotational play, by correspondingly circumferentially distributed guiding wedges of the bearing race. The guiding wedges extend parallel to the rotational axis. The outer face of the guiding wedges are analogous to the spherical outer bearing face and include an outwardly extending curvature with a correspondingly increased diameter.

There are two embodiments with regard to the bearing race. First, the bearing race includes a portion by means of which it is directly supported on the double yoke. Second, the bearing race includes a basic member with a receiving bore and a slotted sliding ring. The sliding ring is secured in the receiving bore. As a result, it is possible to select a sliding ring material which has particularly advantageous sliding properties. The sliding ring needs to provide advantageous friction conditions. The bearing race as such, the basic member, needs to be able to withstand mechanical loads. In particular, it has to be produced from a material which, even under low temperature conditions, is impact-resistant.

In order to ensure that, when external forces act on the protective cone, the cone does not come into contact with the components of the double universal joint contained therein, the bearing race or its basic member includes a projection. The projection projects towards the first axial end. Under normal operating conditions, the folds do not come into contact with the projection. Contact can only be established if the protective cone is subjected to an external force or is loaded in partial regions if the articulation angle is particularly high. If a projection is provided to ensure that the guiding ring and the protective cone can be moved without coming into contact with the bearing race, the rotational diameter of the projection is smaller than the diameter of the first opening of the guiding ring.

From the following detailed description, taken in conjunction with the drawings and subjoined claims, other objects and advantages of the present invention will become apparent to those skilled in the art.

BRIEF DESCRIPTION OF THE DRAWINGS

Two preferred embodiments of the invention are diagrammatically illustrated in the drawing and explained in greater detail with reference thereto.

DETAILED DESCRIPTION OF THE PREFERRED EMBODIMENT

Figure 1:
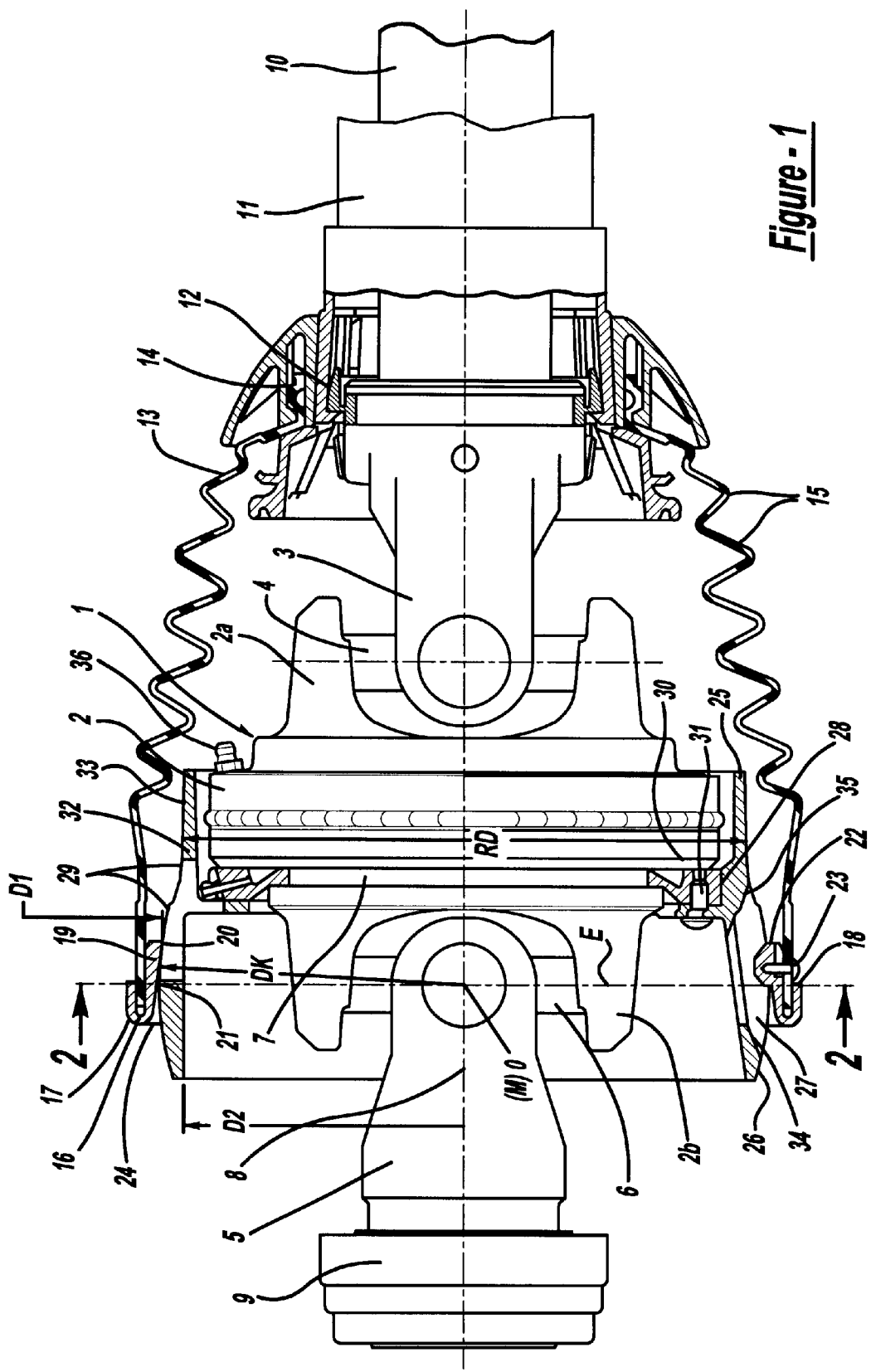
FIG. 1 is a longitudinal section view through a drive assembly along line I—I of FIG. 2 with a double universal joint of a first embodiment of a protective device.
Figure 2:
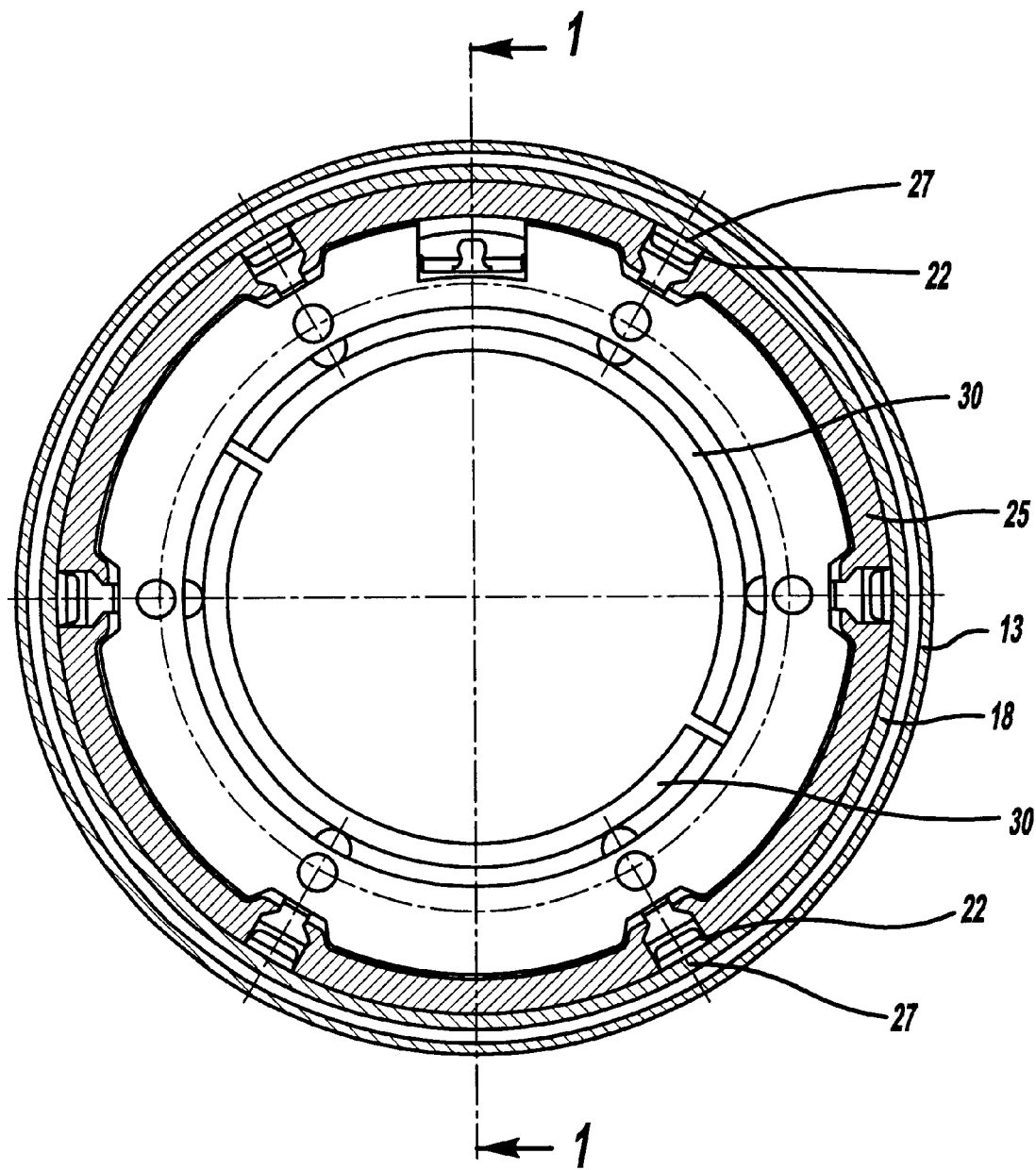
FIG. 2 is a section view through line II—II of FIG. 1 excluding the protective device.

FIG. 1 is a plan view of the double universal joint in the aligned condition. The first embodiment of the protective device is partially shown in section. FIG. 2 shows the protective device in a cross-sectional view along sectional line II—II of FIG. 1. The double universal joint 1 has a double yoke 2 that includes a first yoke 2a and a second yoke 2b projecting from the first in the opposite direction. The first yoke 2a of the double yoke 2 is articulatably connected to the first joint yoke 3 by a first cross member 4. The first joint yoke 3, in turn, is connected to a profiled tube 10 of an intermediate shaft. The profiled tube 10 is connected, via a further profiled tube, to a further universal joint or a double universal joint. This joint serves, for example, to connect to the input journal of a to be driven agricultural implement.

The second yoke 2b of the double yoke 2 is articulatably connected, via a second cross member 6, to a second joint yoke 5. The joint yoke 5 may include, for example, a locking element 9 which connects to a power take-off shaft of a tractor. The components of the double universal joint 1 are all arranged and centered on the rotational axis 8. The rotational axis also constitutes the longitudinal axis. The parts are shown in the non-articulated condition.

The double joint 2, towards the second yoke 2b, includes an annular groove in the form of a bearing groove 7. A bearing assembly 12, which is connected to an outer protective tube 11, is supported on the first joint yoke 3.

The protective tube 11, connected to the bearing assembly 12, covers the profiled tube 10. The protective tube 11 is held in a rotationally fast way relative to the implement. This is accomplished by connecting the tube 11 to a further protective tube inserted into, or slipped over, the tube 11 and to a further protective device. This means that a rotational movement is carried out only by the double universal joint 1 and the profiled shaft or tube connected thereto.

The first axial end 14 of a protective cone 13 is releasably attached to the bearing assembly 12. The first axial end 14 of the protective cone 13 is followed by folds 15. The diameter of the protective cone 13 increases, starting from the axial end 14. The folds 15 are followed by a second axial end 16, which is provided with a receiving bore 17. The protective cone 13 is preferably manufactured from a plastic material. A guiding ring 18 is positioned in the receiving bore 17 of the second axial end 16.

The guiding ring 18 includes a folded-over region which extends over the second axial end 16 of the protective cone 13. A fixing bolt 23 is passed through the guiding ring 18 to firmly connect the protective cone 13 to the guiding ring 18. A plurality of such fixing bolts 23 is circumferentially distributed around the second axial end 16. The fixing bolts 23 are preferably arranged in the region of the cams 22 which project from the inner bearing face 19. With the exception of the cams 22, the inner bearing face 19 is in the form of a hollow spherical zone with a sphere diameter DK. The center of bearing face 19 has been given the reference symbol M.

In the direction towards the first axial end 14, the guiding ring 18 has a first opening 20. The opening 20 has a diameter D1 which is smaller than the sphere diameter DK. The first opening 20 is offset from the center M towards the first axial end 14 by an amount greater than the offset of the second opening 21. The second opening 21 ends with a smaller offset towards or in the center M with the plane E. The plane E preferably also contains the articulation center O, so that the center M and the articulation center O are identical.

The diameter D2 of the second opening 21, at its maximum, is as great as the diameter DK of the hollow spherical zone of the inner bearing face 19. The second opening 21 and thus the hollow-spherical-zone-like inner bearing face 19 is followed by a hollow cylindrical portion 24, which extends away from the axial end 14. The diameter of the hollow cylindrical portion 24 is at least as great as the sphere diameter DK. The guiding ring 18, via its hollow-spherical-zone-like inner bearing face 19, is positioned on a spherical outer bearing face 26 of a bearing race 25. The bearing race 25 has a basic member 29 that at least partially covers the second yoke 2b of the double yoke 2. A projection 32, formed on the basic member 29, projects towards the first yoke 2a.

Guiding grooves 27 extend parallel to the rotational axis 8. The guiding grooves 27 are worked into the spherical outer bearing face 26 of the bearing race. Each of the six circumferentially distributed guiding grooves is engaged, with circumferential play, by a cam 22 of the guiding ring 18. This engagement enables a limited rotational movement of the bearing race 25 relative to the guiding ring 18. As described above, the bearing race 25 is intended to be held in a rotationally fast way relative to the rotating double universal joint 1.

The inner bearing race 25 includes a receiving bore 28. A slotted sliding ring 30 preferably manufactured from a plastic material with advantageous sliding properties, is received and secured by bolts 31 in the receiving bore 28. The slotted sliding ring 30 can be spring-loaded to enable the ring 30 to engage the bearing groove 7. It is then secured by the bolts 31 in the receiving bore 28 of the bearing race 25, so that the unit is fixed on the double yoke 2.

The guiding ring 18 with its inner bearing face 19 is held in contact with, and pre-tensioned relative to, the outer bearing face 26 of the bearing race 25 by means of the folds 15 of the protective cone. When the joint yokes 3, 5 are in the articulated condition, the guiding ring 18 carries out a pivot movement, via its inner bearing face 19 on the outer bearing face 26 of the inner bearing race 25. The pivot movement is limited by the stop ends 34, 35 of the guiding groove 27.

In order to make the lubricating nipple accessible, it is possible, due to the relation of the diameter of the first opening 20 relative to that of the second opening 21 and due to the rotational diameter RD of the outer face 33 of the projection 32, which is smaller than D1, to release the protective cone 13, together with its attaching means, from the bearing assembly 12 and move the cone away from the bearing race 25. In the process, the guiding grooves 27 run out towards the projection 32 such that the cams 22 are able to leave the guiding grooves 27. When again connecting the protective cone 13 with the bearing assembly 13 to the bearing assembly 12, the projection 32 serves to center the guiding ring 18. A lubricating nipple 36, which is not visible and which serves to lubricate the bearing of the cross member 4, also becomes accessible.

The pre-tension of the folds 15 of the protective cone 13 ensures that clearly defined conditions of movement exist. As a result of the pre-tension, the guiding ring 18, via its inner bearing face 19, is permanently kept in contact with the outer bearing face 26 of the bearing race 25.

Figure 3:
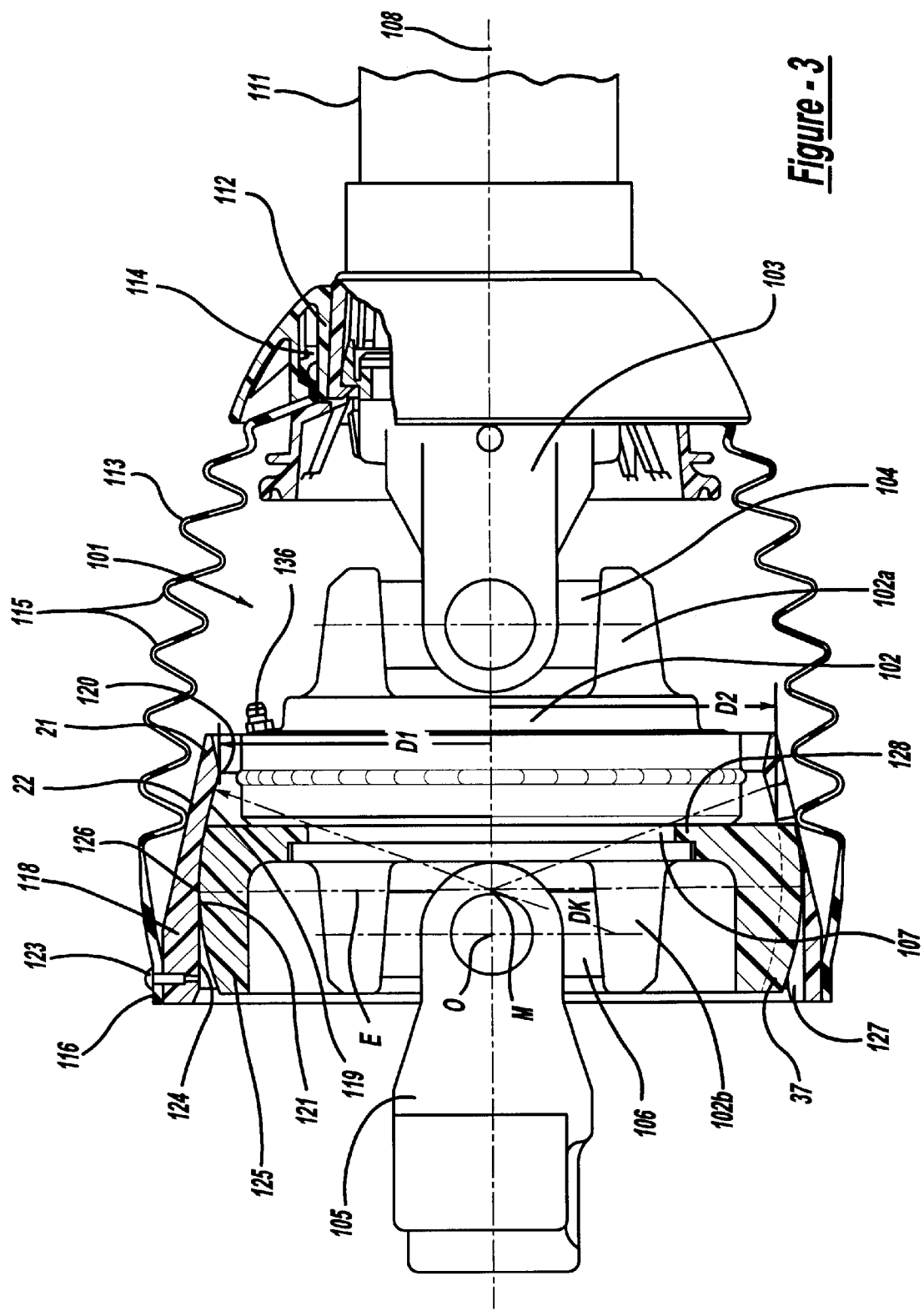
FIG. 3 is a longitudinal section view through a drive assembly with a double universal joint of a second embodiment of a protective device.
Figure 4:
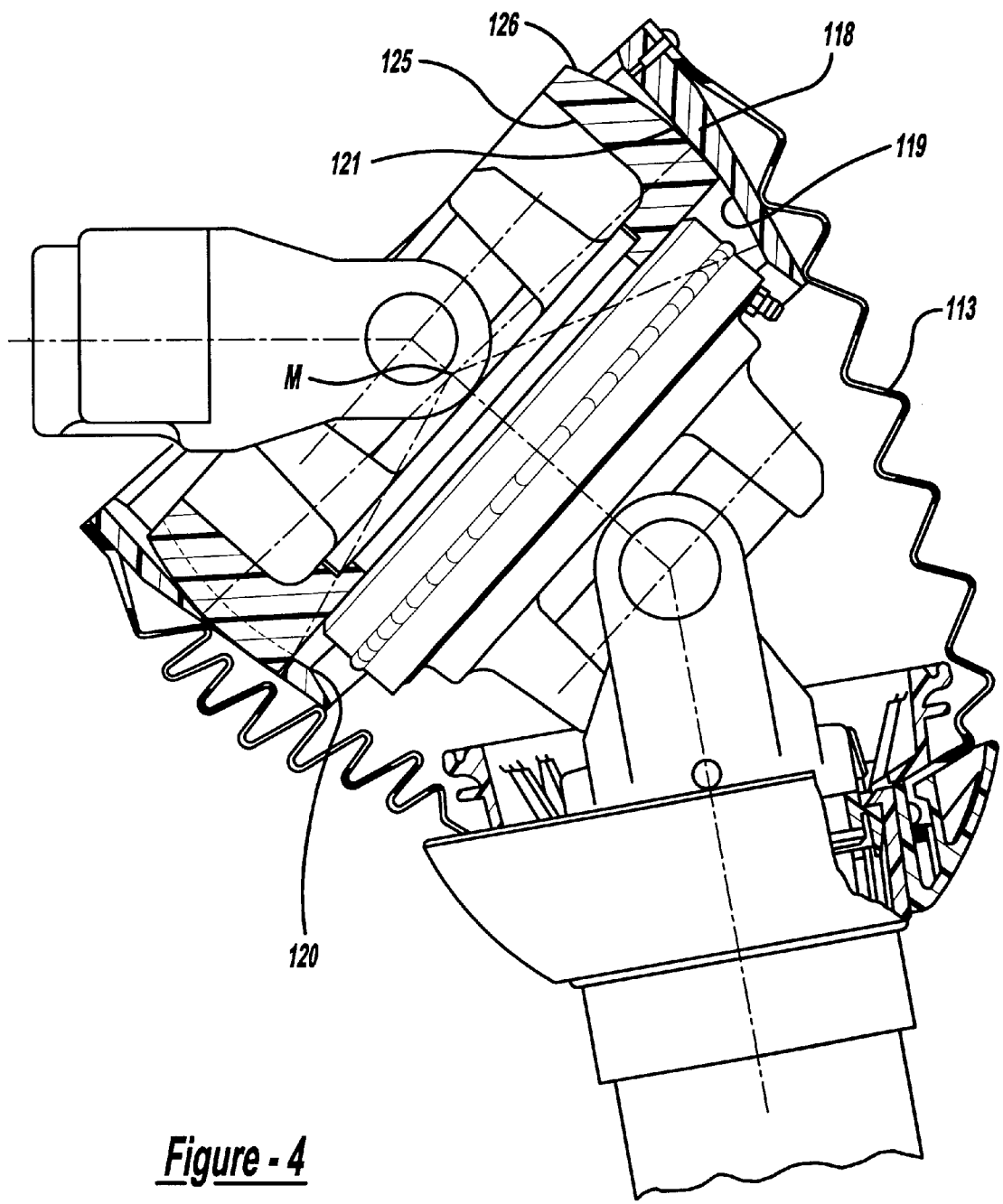
FIG. 4 is a view of the drive assembly according to FIG. 3 under articulation conditions.

FIGS. 3 and 4 show a second embodiment of an inventive protective device. The reference numbers of any components which correspond to the embodiment according to FIGS. 1 and 2 and are used in FIGS. 3 and 4 have been increased by 100 as compared to the components of the embodiment according to FIGS. 1 and 2.

The double universal joint 101 is shown in a plan view in FIGS. 3 and 4, whereas the components of the protective device are shown in section. The description of components which are similar to the embodiment illustrated in FIGS. 1 and 2, will not be described in detail, however, any differences will be explained in greater detail.

One of the differences is in the protective cone 113, at its second axial end 116. The bore is directly positioned on the outer face of the guiding ring 118 and connected thereto by fixing bolts 123. It can also be seen that the guiding ring 118 is lengthened in the direction towards the first axial end 114. The outer face of the guiding ring 118 in that region serves to support the folds 115 under conditions of articulation.

The center M of the hollow-spherical inner bearing face 119 is offset from the articulation center O of the joint towards the first axial end 114. The joint is composed of the second joint yoke 105, the second yoke 102b of the double yoke 102 and the second cross member 106, towards the first axial end 114.

The rotational driving movement of the guiding ring 118 relative to the bearing race 125 differs from that of the embodiment according to FIGS. 1 and 2. Circumferentially distributed guiding grooves 127 are continuously provided in the region extending from the hollow-cylindrical portion 124 to the inner bearing face 119. These grooves 127 are engaged by guiding wedges 37 projecting beyond the outer bearing face 126, which is spherically shaped. The outer face of the guiding wedges 37 is also spherical, but has a correspondingly increased diameter. Due to the circumferential play of the guiding wedges 37 when they engage the guiding grooves 127 around the rotational axis 108, the necessary spatial articulation ability of the guiding ring 118, via its hollow-spherical inner bearing face 119 at the outer bearing face 126 of the bearing race 125, is not obstructed.

If the protective cone 113 is subjected to external forces or under conditions of large articulation angles, the protective cone 113 is able, via its folds 115, to support itself on the guiding ring 118. The guiding ring 118 is lengthened towards the first axial end 114.

In both embodiments it can be seen that the entire region from the first axial end 14 and 114, respectively, to the second axial end 16 and 116, respectively, is covered by the protective cone 13 and 113, respectively. The supporting measures ensure that, when articulated, the protective cone 13, 113 neither kinks nor comes into contact with the rotating parts of the double universal joint 1, 101.

While the above detailed description describes the preferred embodiment of the present invention, the invention is susceptible to modification, variation and alteration without deviating from the scope and fair meaning of the subjoined claims.

What is claimed is:

1. A protective device for a drive assembly with a double universal joint with a double yoke, a first joint yoke, a second joint yoke and a first and a second cross member for articulatably connecting the first joint yoke and the second joint yoke to a first and a second yoke associated with the double yoke, comprising:

a protective cone manufactured from a plastic material including a first axial end, a second axial end and folds between the first and second ends, said protective cone, at least in the axial direction, enabling elastic deformation, with the first axial end of the protective cone serving to be releasably connected to a bearing assembly at the first joint yoke and with the second axial end of the protective cone serving as a fixing portion;

a bearing race rotatably supported around a rotational axis at the double yoke, said bearing race positioned in the protective cone and including a spherical outer bearing face; and a guiding ring including an inner bearing face in the form of a hollow-spherical zone having a center and with a first opening facing the first axial end and with a second opening facing away from said first opening, wherein the second opening defines a diameter which, at its maximum, corresponds to a sphere diameter of the inner bearing face and said first opening defines a diameter which is smaller relative to the second opening, wherein the first opening is offset further from the center of the hollow-spherical-zone inner bearing face towards the first axial end than the second opening, said second opening being either positioned in a plane containing the center of the inner bearing face or is also offset from the center towards the first axial end and said guiding ring is connected to the second axial end of the protective cone and, by pre-tensioning the folds of the protective cone, the guiding ring being held with its inner bearing face in contact with the outer bearing face of the bearing race.

2. A protective device according to claim 1, wherein the guiding ring, in its region adjoining the second opening towards the second axial end, includes a hollow-cylindrical or widening portion whose diameter is at least as great as the sphere diameter of the inner bearing face.

3. A protective device according to claim 1, wherein the center of the outer bearing face and thus of the inner bearing face is offset from an articulation center of a joint towards the first axial end, with said joint being composed of the second joint yoke, of the second yoke of the double yoke, and of the second cross member.

4. A protective device according to claim 1, wherein the center of the outer bearing face and thus of the inner bearing face is identical with the articulation center of a joint composed of the second joint yoke, of the second yoke of the double yoke, and of the second cross member.

5. A protective device according to claim 1, wherein in the direction of rotation, the guiding ring is rotatable to a limited extent relative to the bearing race around the rotational axis.

6. A protective device according to claim 5, wherein the bearing race includes circumferentially distributed guiding grooves which extend parallel to the rotational axis and which are engaged, in the direction of rotation, with play, by the guiding ring via correspondingly circumferentially distributed guiding cams extending parallel to the rotational axis.

7. A protective device according to claim 5, wherein the guiding ring includes circumferentially distributed guiding grooves which extend parallel to the longitudinal axis and which are engaged, with rotational play, by correspondingly circumferentially distributed guiding wedges of the bearing race which extend parallel to the rotational axis and whose outer face, analogously to the spherical outer bearing face, includes an outwardly extending curvature with a correspondingly increased diameter.

8. A protective device according to claim 1, wherein the bearing race has a basic member with a receiving bore and a slotted sliding ring, said sliding ring is secured in the receiving bore.

9. A protective device according to claim 1, wherein the bearing race or a basic member includes a projection which projects towards the first axial end and serves to support the folds of the protective cone in the articulated condition.

10. A protective device according to claim 9, wherein the rotational diameter of the projection is smaller than the diameter of the first opening of the guiding ring.

* * * * *